(12) United States Patent
Kieffer et al.

(10) Patent No.: US 7,380,391 B2
(45) Date of Patent: Jun. 3, 2008

(54) AGRICULTURAL MOWER MANEUVERING AND LIGHTENING DEVICES

(75) Inventors: Fernand Kieffer, Saverne (FR); Horst Neuerburg, Saverne (FR)

(73) Assignee: Kuhn S.A., Saverne (FR)

( * ) Notice: Subject to any disclaimer, the term of this patent is extended or adjusted under 35 U.S.C. 154(b) by 226 days.

(21) Appl. No.: 10/564,970

(22) PCT Filed: Jul. 8, 2004

(86) PCT No.: PCT/FR2004/050317

§ 371 (c)(1),
(2), (4) Date: Jan. 18, 2006

(87) PCT Pub. No.: WO2005/009108

PCT Pub. Date: Feb. 3, 2005

(65) Prior Publication Data

US 2006/0150604 A1  Jul. 13, 2006

(30) Foreign Application Priority Data

Jul. 18, 2003  (FR) .................................. 03 08785

(51) Int. Cl.
*A01D 34/00* (2006.01)
(52) U.S. Cl. .......................... 56/15.2; 91/394; 60/413; 280/414.5

(58) Field of Classification Search ............. 60/413, 60/421, 414, 469, 439; 91/390, 4 R, 4 A, 91/173, 394; 56/10.2 E, 15.8, 6, 15.2, 7, 56/14.5; 172/7, 8; 92/63, 13.1, 11, 174, 92/62, 134
See application file for complete search history.

(56) References Cited

U.S. PATENT DOCUMENTS

| | | | | |
|---|---|---|---|---|
| 5,566,537 A | * | 10/1996 | Kieffer et al. | 56/15.2 |
| 6,085,501 A | * | 7/2000 | Walch et al. | 56/10.2 E |
| 6,349,529 B1 | | 2/2002 | Neuerburg et al. | |
| 6,584,885 B2 | * | 7/2003 | Lou | 92/60 |
| 6,938,399 B2 | * | 9/2005 | Guiet | 56/6 |
| 2003/0154701 A1 | * | 8/2003 | Guiet | 56/6 |
| 2004/0188114 A1 | * | 9/2004 | Schlesser et al. | 172/439 |
| 2005/0000202 A1 | * | 1/2005 | Scordilis | 56/14.7 |
| 2006/0026938 A1 | * | 2/2006 | Cartner | 56/6 |

* cited by examiner

*Primary Examiner*—Árpád F Kovács
(74) *Attorney, Agent, or Firm*—Oblon, Spivak, McClelland, Maier & Neustadt, P.C.

(57) ABSTRACT

A mower including a hitching structure configured to be connected to a motor vehicle, a cutting mechanism, a maneuvering device configured to bring the cutting mechanism from a working position to a maneuvering position, and a lightening device configured to transfer a part of the weight of the cutting mechanism onto the hitching structure, the lightening device including a hydraulic cylinder.

12 Claims, 8 Drawing Sheets

AGRICULTURAL MOWER MANEUVERING AND LIGHTENING DEVICES

BACKGROUND OF THE INVENTION

1. Field of the Invention

The present invention relates to the general technical field of agricultural machinery. It relates more particularly to a mower comprising:

- a hitching structure intended to be connected to a motor vehicle;
- a cutting mechanism extending during work transversely to a direction of advance;
- a carrier beam connected on one hand to the hitching structure by means of a first pivot articulation with a horizontal axis and on another hand to the cutting mechanism by means of a second pivot articulation whose axis is substantially parallel to the axis of the first articulation;
- a maneuvering device intended to bring the cutting mechanism from a working position, in which it rests at least partially on the ground, to a maneuvering position in which the cutting mechanism extends somewhat above the ground;
- a lightening device intended to transfer at least a part of the weight of the cutting mechanism onto the hitching structure, the lightening device comprising a hydraulic cylinder fed with oil by at least one hydropneumatic accumulator by means of a first pipe, the hydraulic cylinder being arranged so as to exert an upward torque on the cutting mechanism.

2. Discussion of the Background

Such a mower is known in the prior art particularly through document FR-A-2 794 934. With this known mower, the maneuvering device intended to bring the cutting mechanism from a working position to a maneuvering position is achieved by means of a second hydraulic cylinder. This second hydraulic cylinder is also arranged so as to exert an upward torque on the cutting mechanism. With this known mower, the user may thus advantageously pass from a working position to a maneuvering position without having to modify the position of the hitching structure relative to the motor vehicle. The operation of this known mower gives the user full satisfaction. However, the cost generated by the installation of the second hydraulic cylinder is not negligible. Thus this solution is rather intended for mowers which have a large working width and whose relatively high-initial cost price is little influenced by the extra cost due to the second hydraulic cylinder.

SUMMARY OF THE INVENTION

The object of the present invention is to propose a less costly solution than that of the prior art so that mowers having a small cutting width may also have the function of the maneuvering device without, for all that, excessively increasing their cost price.

For this purpose, the mower according to the present invention is characterized in that the maneuvering device consists of a cylinder whose interior is divided into two chambers by a floating piston, a first chamber of the chambers being connected to the hydraulic cylinder of the lightening device by means of a second pipe and the other chamber being connected to a hydraulic circuit of the motor vehicle by means of a third pipe so as to be able to inject from the first chamber an additional quantity of oil into the hydraulic cylinder of the lightening device to bring the cutting mechanism from the working position into the maneuvering position, and to be able to extract the same quantity of oil from the hydraulic cylinder to bring the cutting mechanism from the maneuvering position into the working position.

With the present invention, it is therefore not necessary to have recourse to a second hydraulic cylinder to obtain the maneuvering device function. The hydraulic cylinder of the lightening device advantageously serves for the lightening and for the maneuvering of the cutting mechanism. The cost generated by the solution according to the present invention is therefore lower. In addition, on each return to the working position, the device automatically reverts to the initial pressure and consequently the same lightening of the cutting mechanism. Finally, this device makes it possible to modify the ground pressure during work according to the nature of the land.

BRIEF DESCRIPTION OF THE DRAWINGS

Other features of the invention, to be considered separately or in all their possible combinations, will become more clearly apparent from the following description of an exemplary nonlimiting embodiment of the invention represented in the appended drawings, in which:

FIG. 2 represents, seen in the direction of the arrow II defined in FIG. 1, the mower in the maneuvering position.

DETAILED DESCRIPTION OF THE PREFERRED EMBODIMENTS

Figure 1:
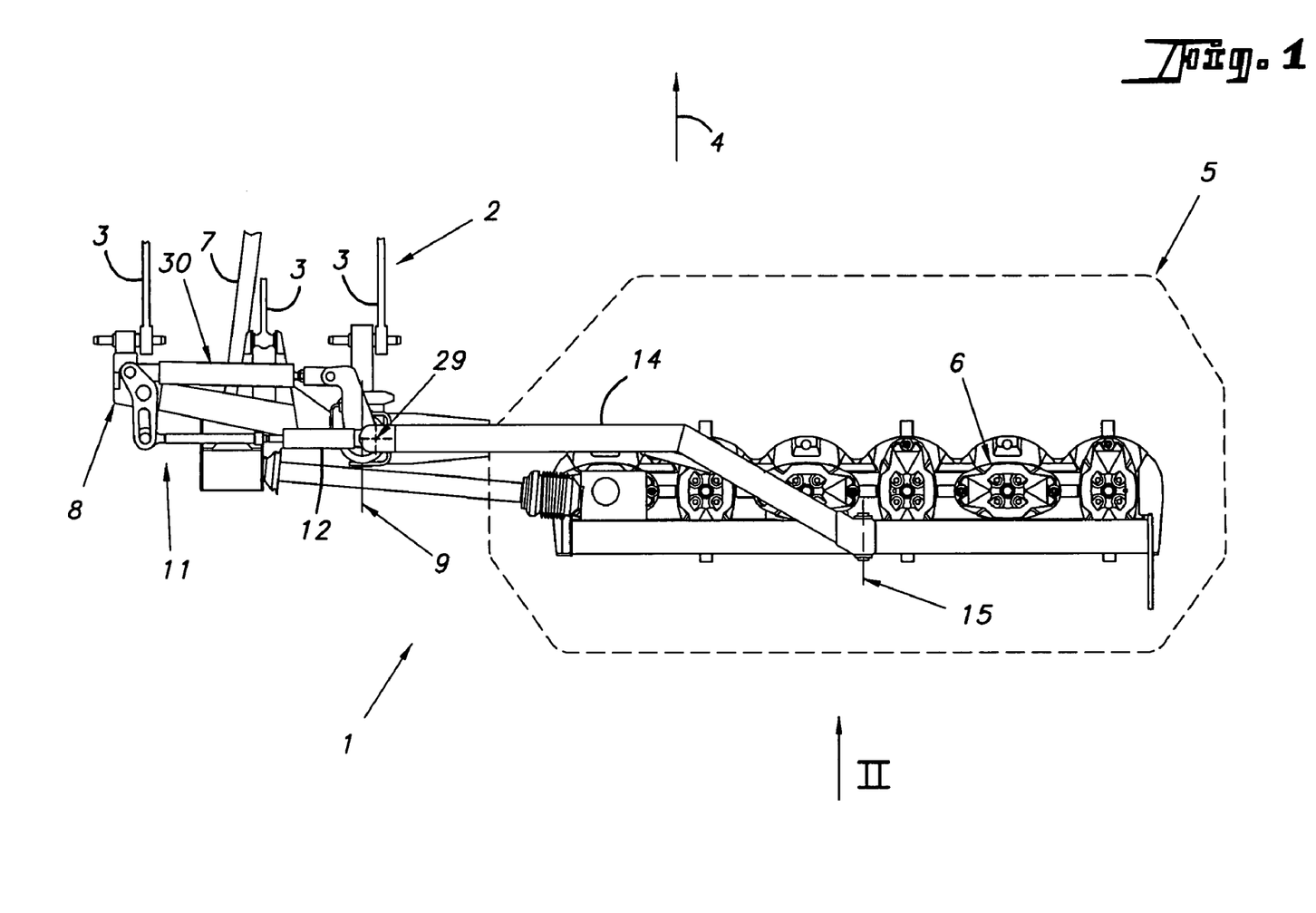
FIG. 1 represents, seen from above, a mower according to the present invention in the working position.

FIG. 1 represents, seen from above, a mower (1) according to the present invention. The mower (1) is hitched to a motor vehicle (2) visible in FIG. 2. Accordingly, the mower (1) comprises a hitching structure (8) intended to be connected to the linkage arms (3) of the motor vehicle (2). The motor vehicle (2) pulls the mower (1) in a line and direction of advance represented by the arrow (4). In the rest of the description, the following concepts, "front" and "rear", "in front of" and "behind" are defined relative to the direction of advance (4) and the concepts "right" and "left" are defined while looking at the mower (1) from the rear in the direction of advance (4).

Figure 2:
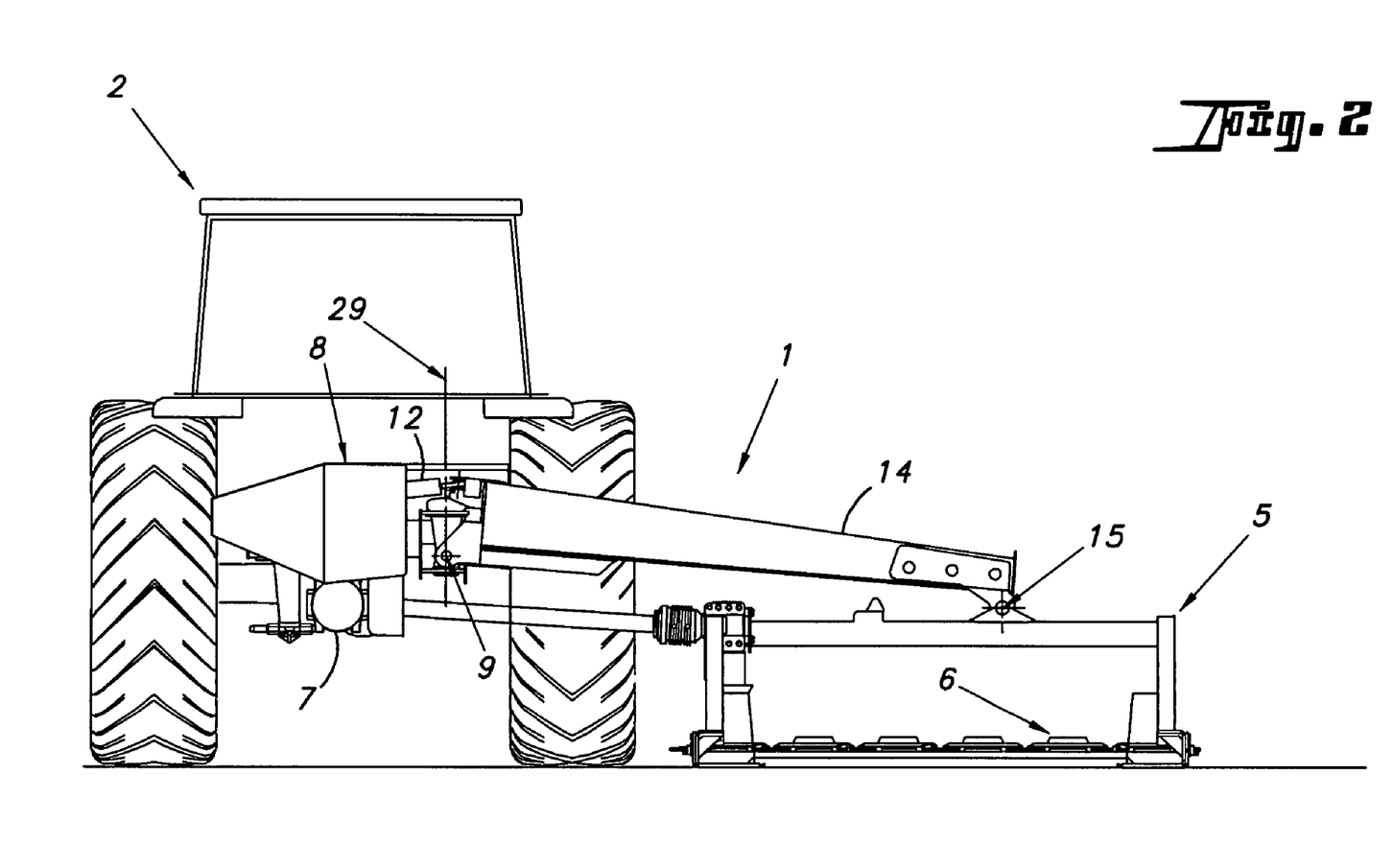
FIG. 2 represents, seen in the direction of the arrow II defined in FIG. 1, the mower in the working position.

The mower (1) comprises a cutting mechanism (5), intended to cut a standing product, such as grass for example. To do this, the cutting mechanism (5) comprises cutting members (6) driven in rotation about a respective axis directed upward. The rotational drive to the cutting members (6) is provided from a power take-off of the motor vehicle (2) and by means of transmission elements (7). The production of such a cutting mechanism (5) is known to those skilled in the art and will therefore not be described further.

Figure 3:
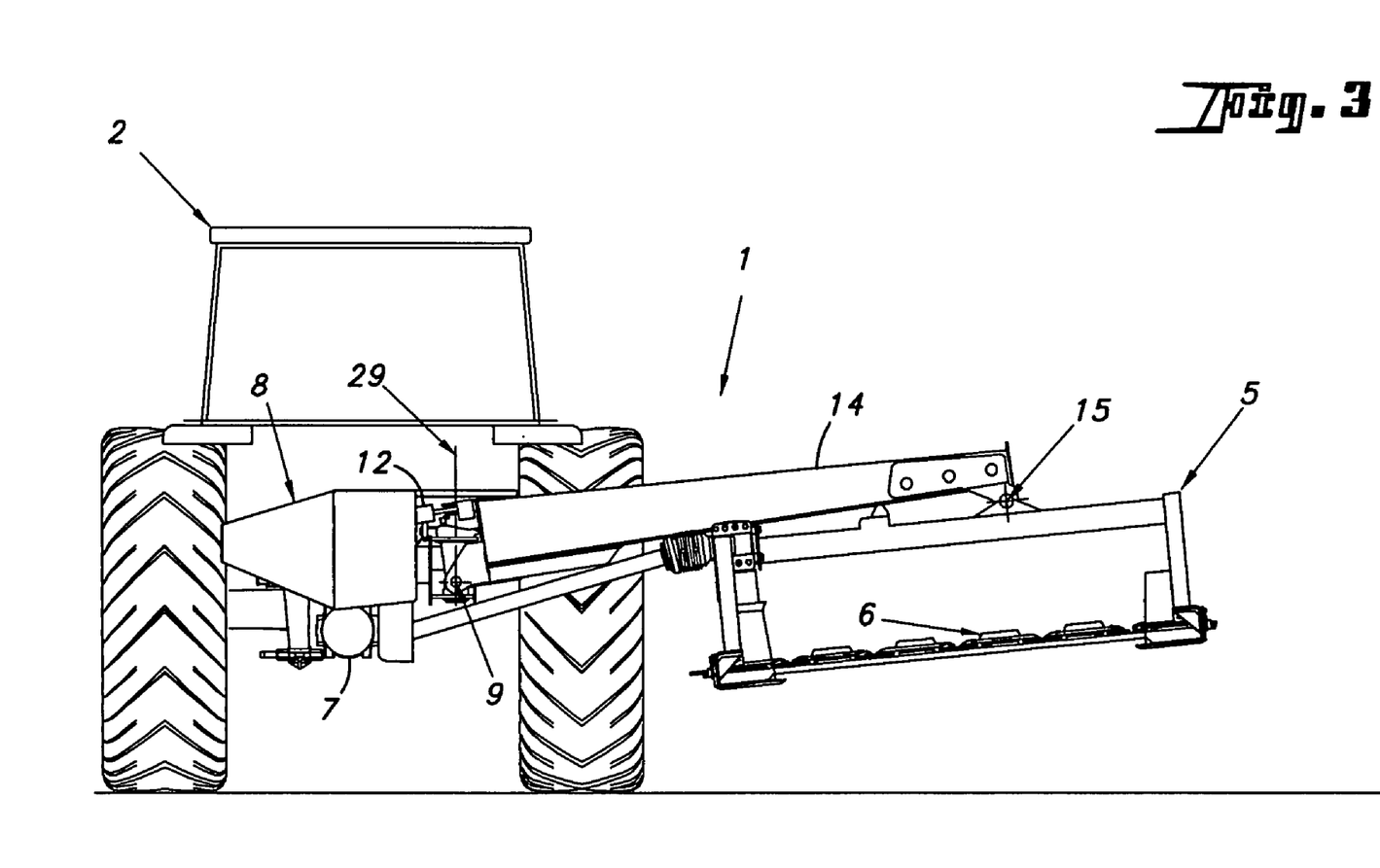

In the light of FIGS. 1 and 2, the cutting mechanism (5) extends, during work, transverse to the direction of advance (4) and it rests at least partially on the ground. The cutting mechanism (5) may furthermore occupy a maneuvering position in which it extends somewhat above the ground as shown in FIG. 3. To do this, the mower (1) comprises a carrier beam (14) one of whose ends is connected to the hitching structure (8) by means of a first pivot articulation (9) with a horizontal axis. During work, the axis of the first articulation (9) is also directed in the direction of advance (4). The other end of the carrier beam (14) is connected to the cutting mechanism (5) by means of a second pivot articulation (15) whose axis is substantially parallel to the axis of the first articulation (9). Also provided is a maneuvering device (10) intended to cause the cutting mechanism (5) to pivot about at least one of the articulations (9, 15) so as to move the cutting mechanism (5) from the working position to the maneuvering position, and vice versa. The maneuvering device (10) will be described in detail later.

Figure 5:
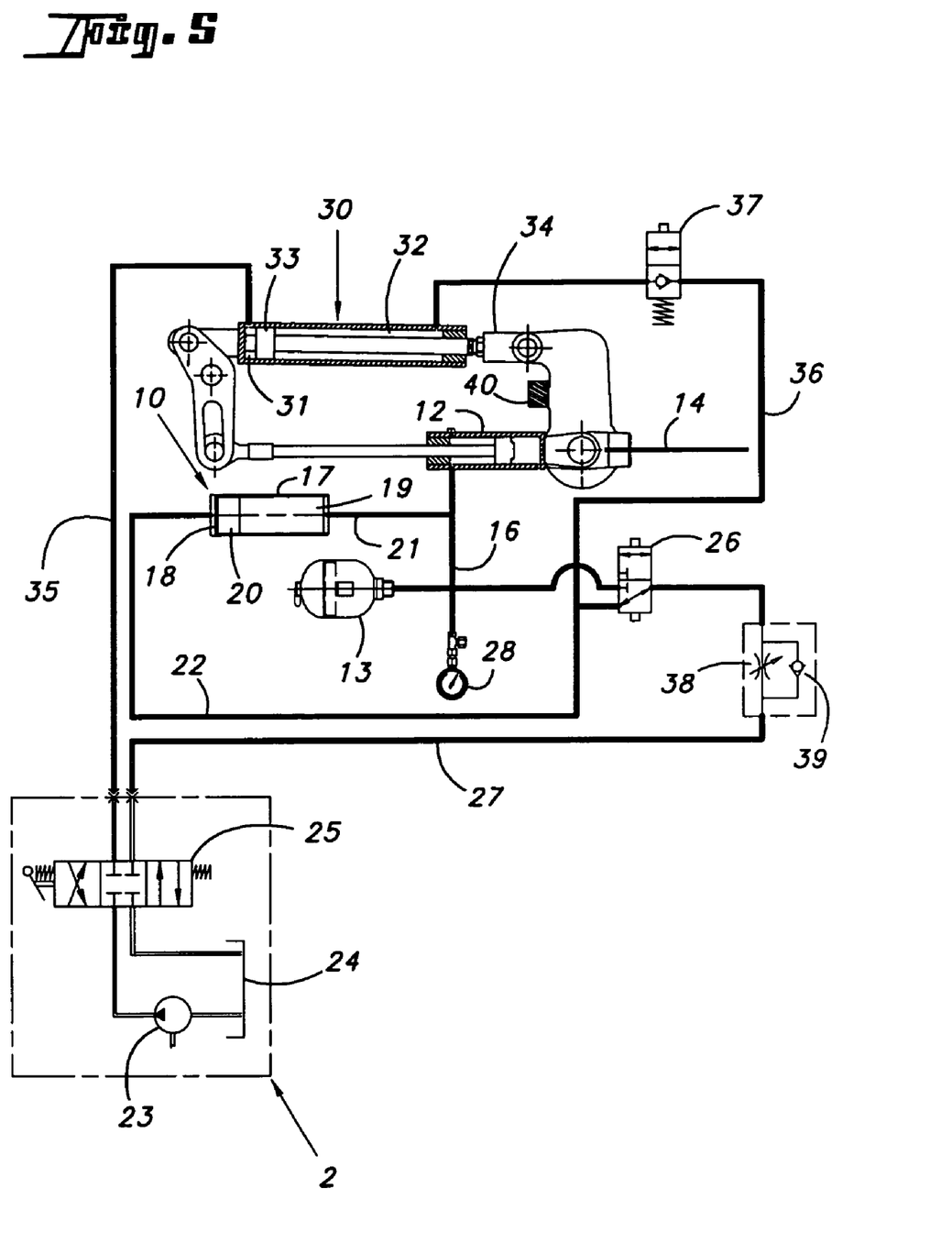
FIG. 5 represents schematically the hydraulic circuit of the mower according to the present invention when the latter is in the working position.

The mower (1) also comprises a lightening device (11) intended to transfer at least a part of the weight of the cutting mechanism (5) onto the hitching structure (8). The lightening device (11) comprises for this purpose a hydraulic cylinder (12) fed with oil by at least one hydropneumatic accumulator (13). The hydraulic cylinder (12) is arranged so as to exert an upward torque on the cutting mechanism (5) about at least one of the articulations (9, 15). In the exemplary embodiment represented in the figures, the hydraulic cylinder is more precisely arranged above the first articulation (9). In addition, the hydraulic cylinder (12) is connected on one hand to the hitching structure (8) and on another hand to the carrier beam (14). With reference to FIG. 5, the hydropneumatic accumulator (13) is connected to the small chamber of the hydraulic cylinder (12) by means of a first pipe (16). The inflation pressure of the hydropneumatic accumulator (13) makes it possible to feed the hydraulic cylinder (12) with oil having a certain pressure. This pressure allows the cylinder (12) to exert a torque on the carrier beam (14) so as to transfer a part of the weight of the cutting mechanism (5) onto the hitching structure (8).

The maneuvering device (10) comprises means intended to inject an additional quantity of oil into the hydraulic cylinder (12) to bring the cutting mechanism (5) from the working position into the maneuvering position, and to extract the same quantity of oil from the hydraulic cylinder (12) to bring the cutting mechanism (5) from the maneuvering position into the working position.

In the exemplary embodiment represented more precisely in FIGS. 5 to 8, the maneuvering device (10) consists of a cylinder (17) whose interior is divided into two chambers (18, 19) by a floating piston (20). The chamber (19) of the cylinder (17) is connected to the small chamber of the cylinder (12) by means of a second pipe (21). More precisely, the second pipe (21) is connected to the first pipe (16). For its part, the chamber (18) is connected to the hydraulic circuit of the motor vehicle (2) by means of a third pipe (22). The motor vehicle (2) specifically comprises a pump (23), an oil reservoir (24) and a directional control valve (25).

The mower (1) according to the present invention operates in the following manner.

FIG. 5 represents the state of the hydraulic circuit of the mower (1) when the cutting mechanism (5) is in the working position. The floating piston (20) occupies an end position, to the left in the figure, so that the chamber (18) has a minimum volume and the chamber (19) has a maximum volume. The chamber (19) is filled with oil. When the motor vehicle (2) and the cutting mechanism (5) rest on flat ground, as shown in FIG. 2, the hydraulic cylinder (12) advantageously occupies an intermediate position. The available stroke of the hydraulic cylinder (12) allows the cutting mechanism (5) to fall and rise relative to the hitching structure (8) so as to follow the height differences of the ground independently of the position of the motor vehicle (2). The unevennesses of the ground then cause variations in the volume of the small chamber of the hydraulic cylinder (12). These variations in volume are compensated for by the oil contained in the hydropneumatic accumulator (13).

Figure 6:
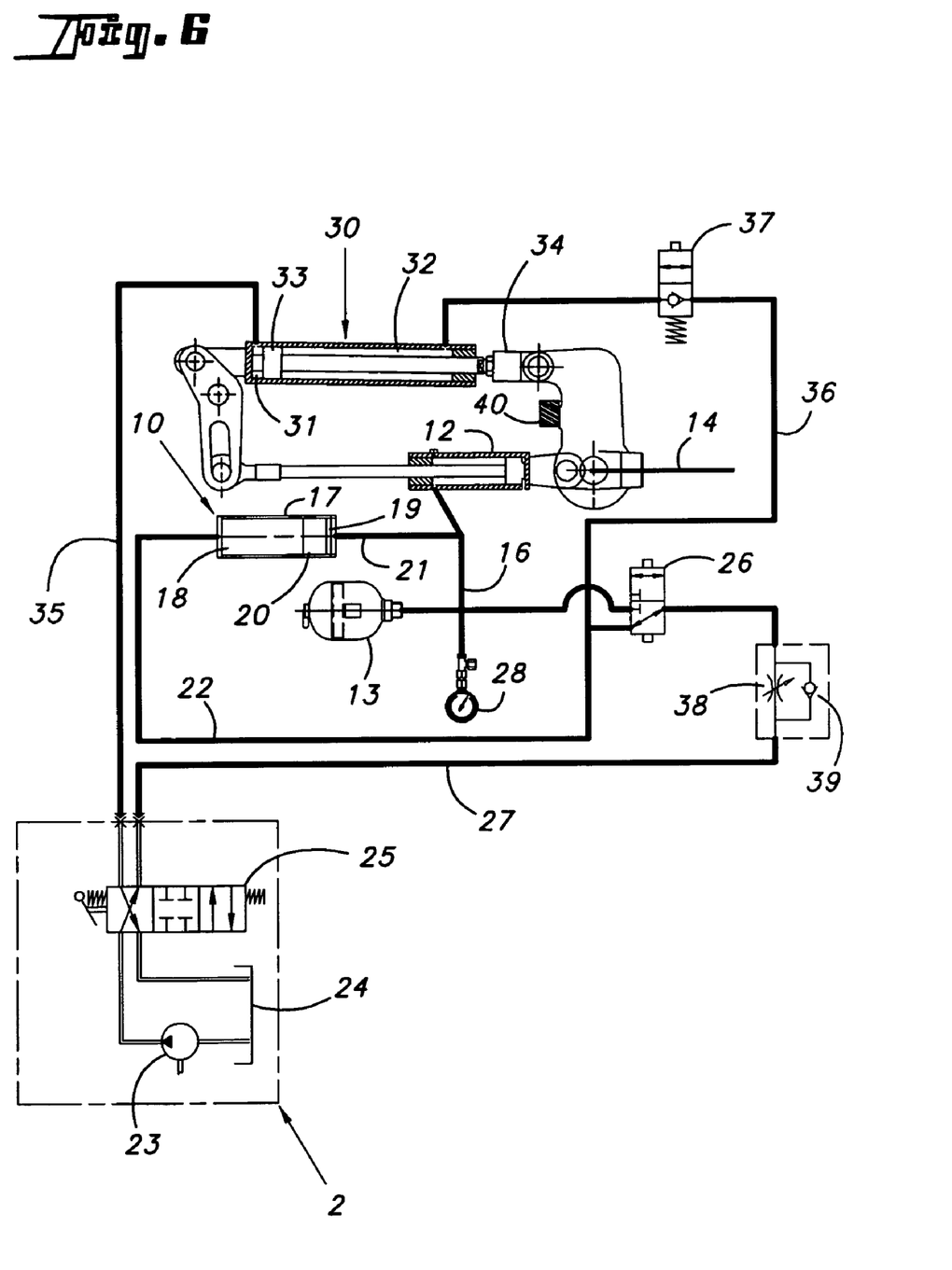
FIG. 6 represents schematically the hydraulic circuit when the mower is in the maneuvering position.

In the light of FIG. 6, to place the cutting mechanism (5) in the maneuvering position the user operates the directional control valve (25) in order to connect the third pipe (22) to the pump (23). The oil originating from the pump (23) feeds the chamber (18) and causes the floating piston (20) to move inside the cylinder (17). The oil initially contained in the chamber (19) is then injected into the small chamber of the hydraulic cylinder (12) via the second pipe (21) and the first pipe (16). This additional quantity of oil causes the retraction of the hydraulic cylinder (12) and therefore the raising of the cutting mechanism (5). The latter is then situated somewhat above the level of the ground, which facilitates the maneuvers at the end of a field for example.

To return to the working position, the user operates the directional control valve (25) so as, this time, to connect the third pipe (22) to the reservoir (24). The pressure in the chamber (18) again falls substantially to zero. The inflation pressure of the hydropneumatic accumulator (13) and the weight of the cutting mechanism (5) via the hydraulic cylinder (12) then cause the floating piston (20) to move toward the left in FIGS. 5 and 6. Once the floating piston (20) has reached its end position represented in FIG. 5, all the oil contained in the chamber (18) is returned to the reservoir (24). For its part, the additional quantity of oil is extracted from the hydraulic cylinder (12) to return to the chamber (19). The user therefore again finds exactly the situation represented in FIG. 5. The quantity of oil present in the hydraulic cylinder (12), the first pipe (16) and the hydropneumatic accumulator (13) is exactly the same as in the previous working position. The user therefore advantageously again finds the initial pressure of the hydropneumatic accumulator (13) and, consequently, the same lightening of the cutting mechanism (5).

Figure 7:
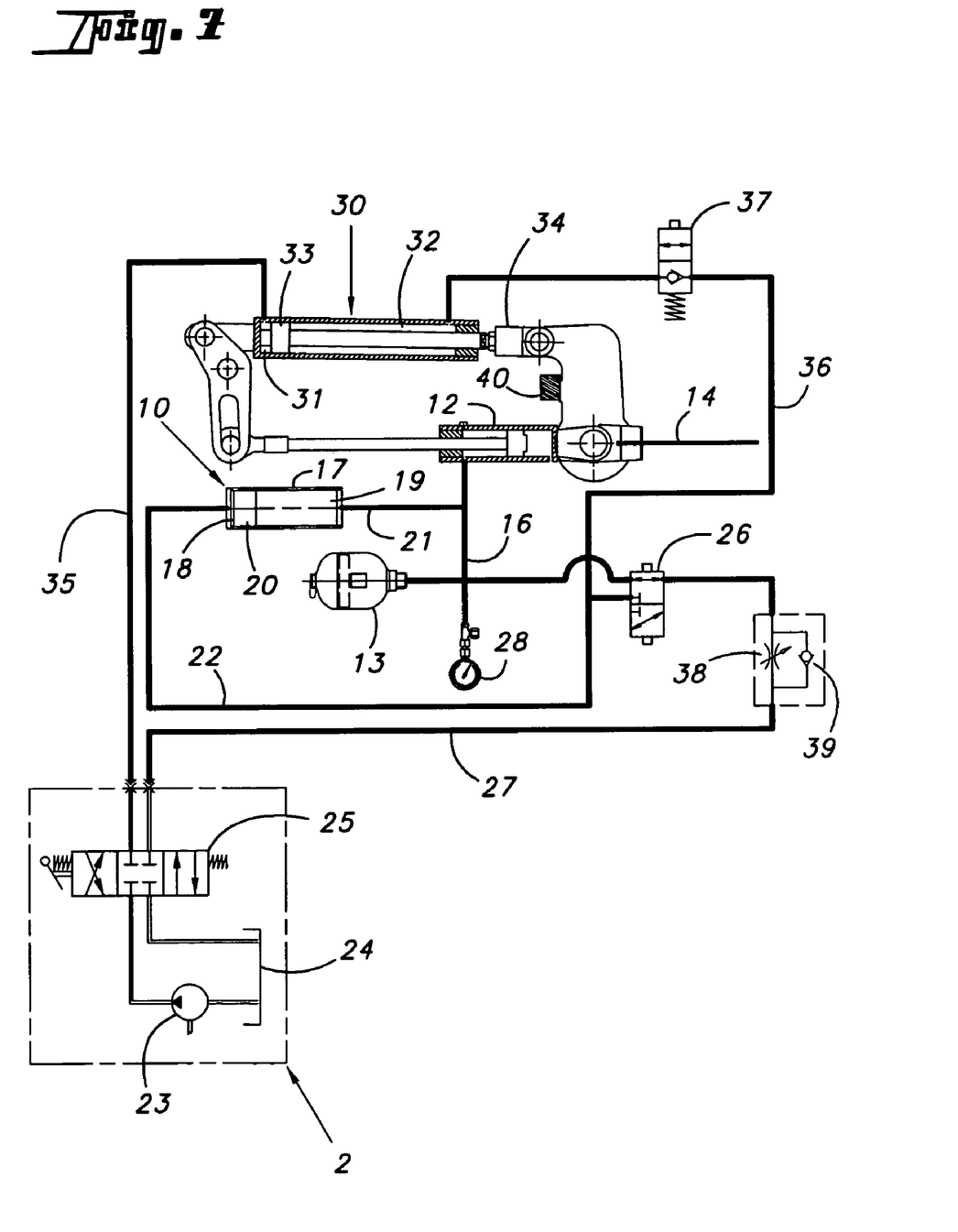
FIG. 7 represents schematically the hydraulic circuit during the adjustment of the lightening degree.

Preferably, the mower (1) comprises a three-way valve (26) that can occupy two positions. The inlet of the valve (26) is connected to the directional control valve (25) by means of a fourth pipe (27). An outlet of the valve (26) is connected to the third pipe (22). The other outlet of the valve (26) is connected to the first pipe (16). When the valve (26) occupies a first position as shown in FIGS. 5 and 6, the third pipe (22) is in communication with the fourth pipe (27). For its part, the outlet connected to the first pipe (16) is closed. This first position of the valve (26) allows the operation described hereinabove of the mower (1). When the valve (26) occupies a second position as shown in FIG. 7, the first pipe (16) is in communication with the fourth pipe (27). For its part, the outlet connected to the third pipe (22) is closed. This second position of the valve (26) allows the user to adjust the pressure of the accumulator (13) during work and therefore the lightening degree of the cutting mechanism (5). By operating the directional control valve (25) when the valve is in the second position, the user may increase or reduce the quantity of oil present in the hydraulic cylinder (12), the first pipe (16) and the hydropneumatic accumulator (13). Since the outlet of the valve (26) connected to the third pipe (22) is closed, the floating piston (20) cannot move. The quantity of oil added or removed by the user acts therefore directly on the pressure of the gas contained in the accumulator (13). Preferably, a pressure gauge (28) is provided, connected to the first pipe (16) in order to indicate to the user the pressure existing in the hydropneumatic accumulator (13).

Figure 4:
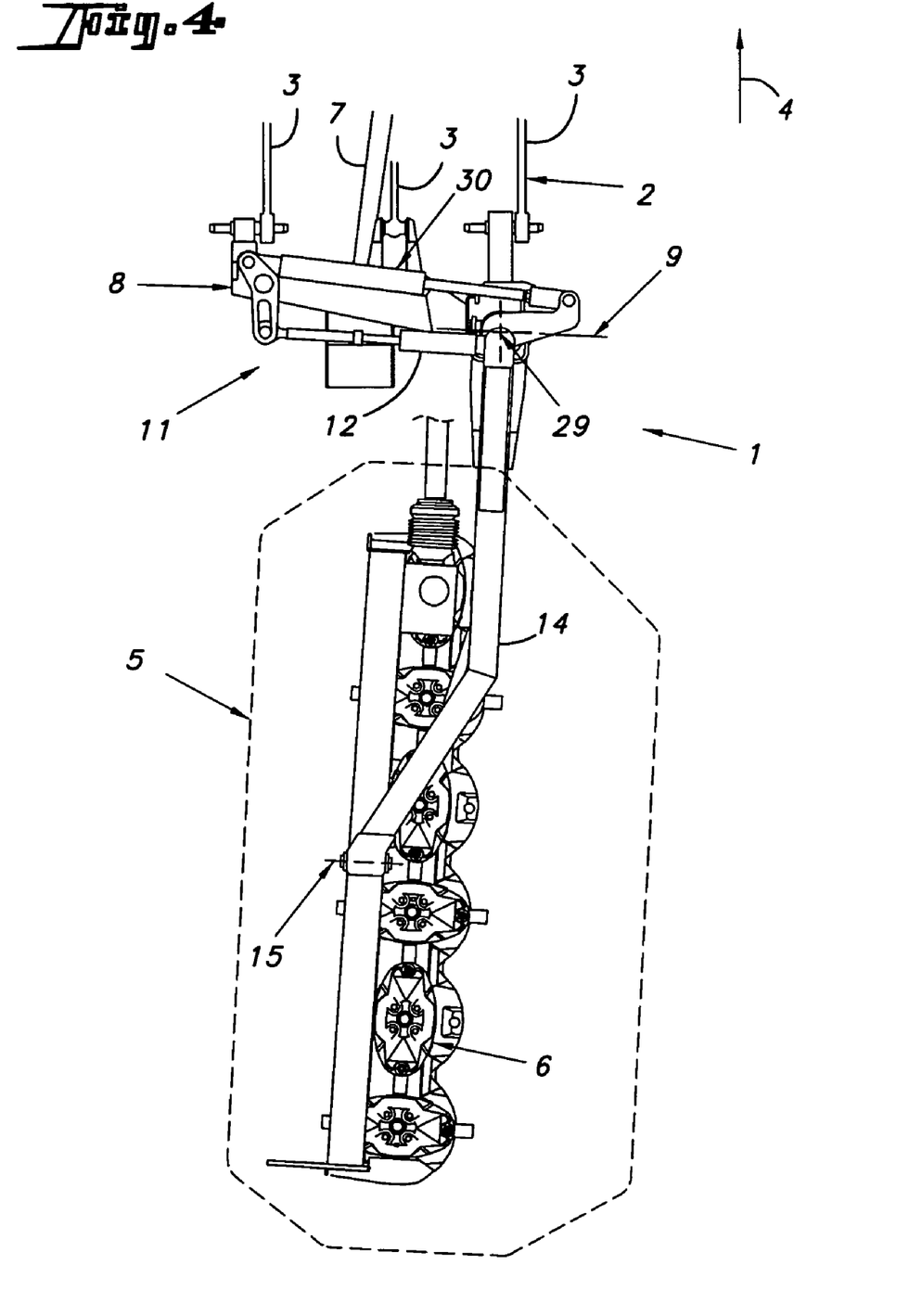
FIG. 4 represents, seen from above, the mower of FIG. 1 in the transport position.

Preferably, the carrier beam (14) is connected to the hitching structure (8) also by means of a third pivot articulation (29) with an axis directed upward. Thus, in the light of FIG. 4, the cutting mechanism (5) and the carrier beam (14) are jointly pivoted rearward about the third articulation (29) during transport. For this purpose, a second hydraulic cylinder (30) is provided, connected on one hand to the hitching structure (8) and on another hand to the carrier beam (14).

Figure 8:
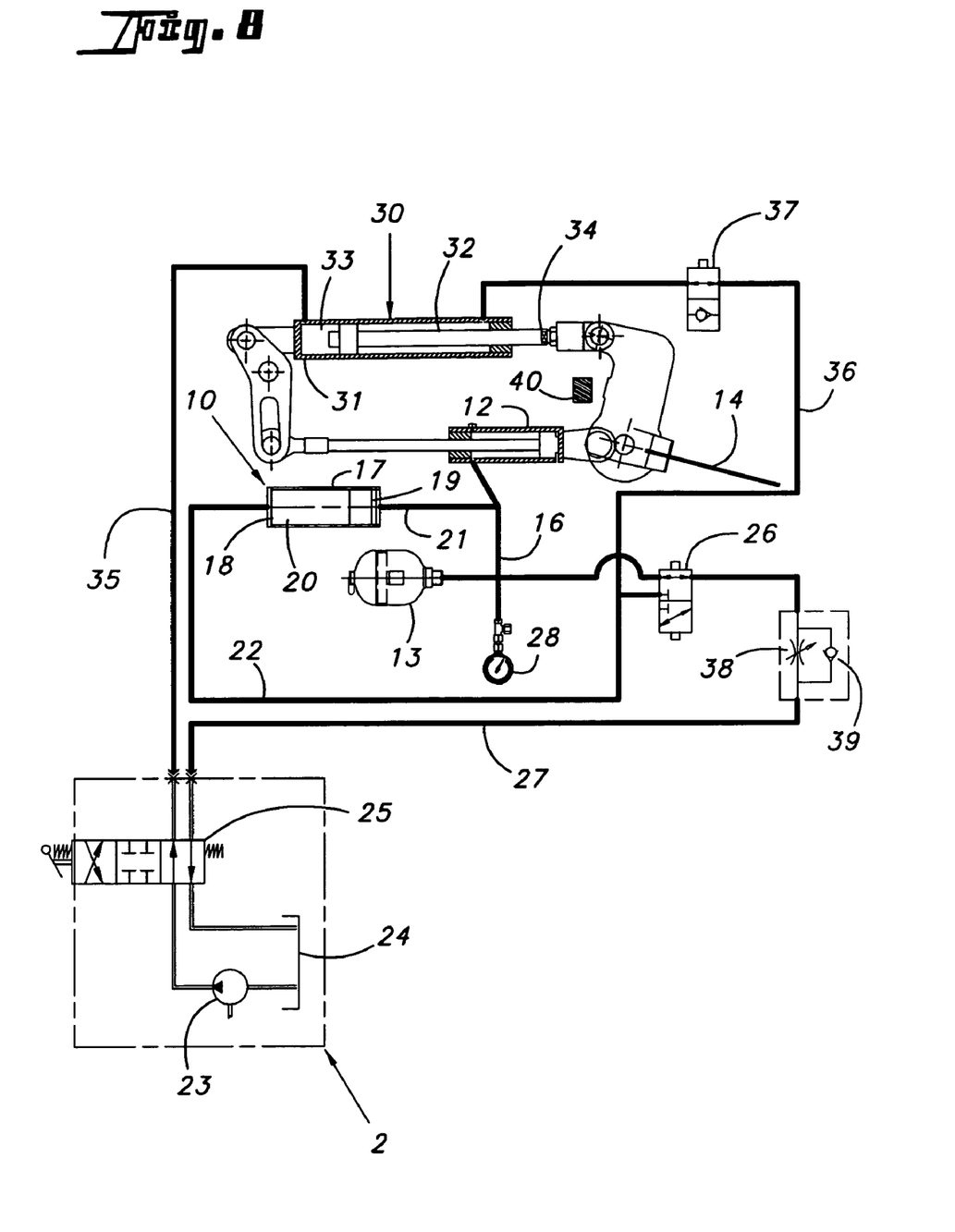
FIG. 8 represents schematically the hydraulic circuit when the mower is in the transport position.

In the light of FIGS. 5 to 8, the second hydraulic cylinder (30) is a double-acting cylinder. The second hydraulic cylinder (30) therefore comprises a first chamber (31) and a second chamber (32) delimited by a piston (33), the piston (33) being rigidly fastened to a rod (34) connected to the carrier beam (14). The first chamber (31) is connected to the directional control valve (25) by means of a fifth pipe (35). The directional control valve (25) is thus a double-acting directional control valve whose outlets are connected to the fourth pipe (27) and to the fifth pipe (35). The second chamber (32) is connected to the third pipe (22) via a sixth pipe (36). The sixth pipe (36) comprises a second directional control valve (37) capable of occupying two positions. In a first position, as shown in FIGS. 5 to 7, the second directional control valve (37) behaves like an anti-return valve preventing any outlet of oil from the second chamber (32). In a second position, as shown in FIG. 8, the second directional control valve (37) allows the free passage of oil in the sixth pipe (36). Preferably, a flow limiter (38) and an anti-return valve (37) are also provided in parallel on the fourth pipe (27). The flow limiter (38) is preferably adjustable.

The placement in the working position, the placement in the maneuvering position and the adjustment of the lightening degree are similar to those already described hereinabove. The flow limiter (38) and the anti-return valve (39) advantageously make it possible to slow the return of oil toward the reservoir (24). The result of this is that the return to the working position and the lightening reduction occur more slowly, while the placement in the maneuvering position and the increase of the lightening occur at normal speed.

In the light of FIG. 5, the placement in the maneuvering position also causes the pressurization of the sixth pipe (36) and of the second chamber (32). The carrier beam (14) is therefore held tight against a stop (40). The cutting mechanism (5) remains arranged transversely to the direction of advance (4). The return to the working position causes the pressurization of the fifth pipe (35). On the other hand, the second directional control valve (37) here plays the role of an anti-return valve. The second cylinder (30) cannot extend. The cutting mechanism (5) again remains arranged transversely to the direction of advance (4).

With reference to FIG. 8, for the placement in the transport position, the user operates, in a first step, on the second directional control valve (37) so as to leave a free passage to the oil in the sixth pipe (36). The user then operates the directional control valve (25) of the motor vehicle (2) in order to connect the fifth pipe (35) to the pump (23) and to connect the fourth pipe (27) to the reservoir (24). The pressurized oil arriving in the first chamber (31) of the second cylinder (30) pushes the piston (33), which causes the rod (34) to emerge. The oil contained in the second chamber (32) is injected into the third pipe (22) via the sixth pipe (36) and the second directional control valve (37), which is now allowing free flow. In a particularly advantageous manner, the flow limiter (28) slows the return of this oil to the reservoir (24).

This causes an increase in the pressure in the third pipe (22). The floating piston (20) of the cylinder (17) is then moved toward the right. The hydraulic cylinder (12) retracts and the cutting mechanism (5) is separated from the ground. When the second hydraulic cylinder (30) has reached its maximum extension, the cutting mechanism (5) is oriented in the direction of advance (4) as in FIG. 4. A mechanical stop, not shown, advantageously makes it possible to keep the cutting mechanism (5) inclined upward. Thus, during transport, the ground clearance of the mower (1) is advantageously increased.

The mower that has just been described is only an exemplary embodiment and can, in no circumstances, limit the scope of protection defined by the following claims.

The invention claimed is:

1. A mower comprising:
   a hitching structure configured to be connected to a motor vehicle;
   a cutting mechanism extending during work transversely to a direction of advance;
   a carrier beam connected to the hitching structure by a first pivot articulation with a horizontal axis and to the cutting mechanism by a second pivot articulation whose axis is substantially parallel to the axis of the first articulation;
   a maneuvering device configured to bring the cutting mechanism from a working position, in which the cutting mechanism rests at least partially on the ground, to a maneuvering position in which the cutting mechanism extends somewhat above the ground, and vice versa;
   a lightening device configured to transfer at least a part of the weight of the cutting mechanism onto the hitching structure, the lightening device including a first hydraulic cylinder fed with oil by at least one hydropneumatic accumulator by a first pipe, the first hydraulic cylinder configured to exert an upward torque on the cutting mechanism;
   wherein the maneuvering device includes a floating piston cylinder whose interior is divided into first and second chambers by a floating piston, wherein the first chamber is connected to the first hydraulic cylinder by a second pipe and the second chamber is connected to a hydraulic circuit of the motor vehicle by a third pipe, wherein said hydraulic circuit is configured to inject from the first chamber of said floating piston cylinder an additional quantity of oil into the first hydraulic cylinder of the lightening device to bring the cutting mechanism from the working position into the maneuvering position, and to, wherein said hydraulic circuit is configured to extract said additional quantity of oil from the first hydraulic cylinder into said first chamber of said floating piston cylinder so as to bring the cutting mechanism from the maneuvering position into the working position.

2. A mower as claimed in claim 1, further comprising a three-way valve, an inlet of the valve being connected to the hydraulic circuit of the motor vehicle by a fourth pipe, a first outlet of the valve being connected to the third pipe, and a second outlet of the valve being connected to the first pipe.

3. A mower as claimed in claim 2, further comprising a flow limiter provided on the fourth pipe.

4. A mower as claimed in claim 3, further comprising an anti-return valve mounted in parallel with the flow limiter on the fourth pipe.

5. A mower as claimed in claim 1, wherein the carrier beam is additionally connected to the hitching structure by a third pivot articulation with an upward-directed axis, and a second hydraulic cylinder is provided, connected to the hitching structure and to the carrier beam to pivot rearward the cutting mechanism and the carrier beam about the third articulation during transport.

6. A mower as claimed in claim 5, wherein the second hydraulic cylinder includes a third chamber and a fourth chamber delimited by a piston, the third chamber being connected to the hydraulic circuit of the motor vehicle by a fifth pipe.

7. A mower as claimed in claim 6, wherein the fourth chamber is connected to the third pipe by a sixth pipe.

8. A mower as claimed in claim 7, wherein, on the sixth pipe, a directional control valve is provided that can occupy two positions.

9. A mower as claimed in claim 1, wherein said second pipe is connected to said first pipe.

10. A mower as claimed in claim 1, wherein said hitching structure does not move relative to said motor vehicle when said cutting mechanism is brought from the working position into said maneuvering position and vice versa.

11. A mower as claimed in claim 1, wherein said first hydraulic cylinder is arranged substantially parallel to the ground.

12. A mower as claimed in claim 1, wherein said first hydraulic cylinder is arranged substantially parallel to said carrier beam in said maneuvering position.

* * * * *